Figure 1:
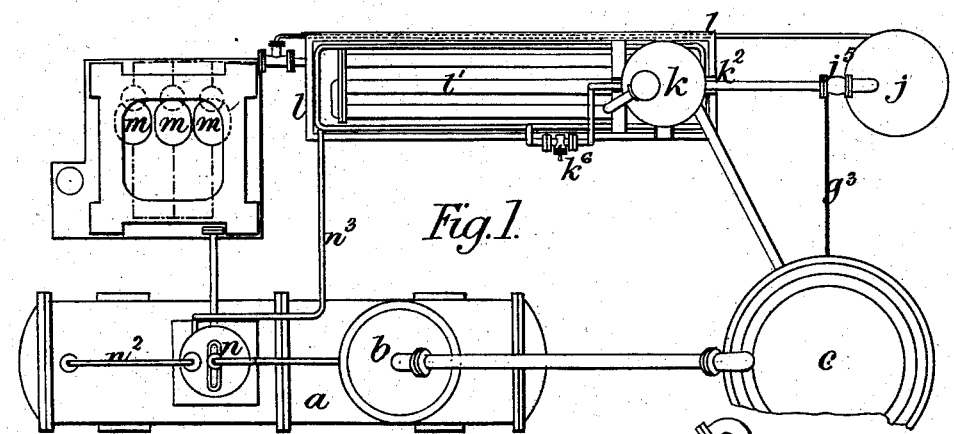

(No Model.)  6 Sheets—Sheet 1.

H. F. STANLEY.
Cooling and Refrigerating Apparatus.

No. 240,049.  Patented April 12, 1881.

Witnesses  
Inventor  
Harry F. Stanley,  
By his Attorneys  
Baldwin, Hopkins & Payton (No Model.) 6 Sheets—Sheet 2.

H. F. STANLEY.
Cooling and Refrigerating Apparatus.

No. 240,049. Patented April 12, 1881.

Witnesses.
Wm. A. Skinkle
Geo. W. Breck

Inventor
Harry F. Stanley,
By his Attorneys
Baldwin, Hopkins & Peyton.

(No Model.) 6 Sheets—Sheet 3.

H. F. STANLEY.
Cooling and Refrigerating Apparatus.

No. 240,049. Patented April 12, 1881.

Witnesses,
Wm A Skinkle
Geo. W. Breck

Inventor,
Harry F. Stanley
By his Attorneys
Baldwin, Hopkins & Peyton (No Model.)  6 Sheets—Sheet 4.

H. F. STANLEY.
Cooling and Refrigerating Apparatus.

No. 240,049.      Patented April 12, 1881.

Witnesses
Wm A. Skinkle
Geo W. Breck

Inventor
Harry F. Stanley,
By his Attorneys
Baldwin, Hopkins & Peyton (No Model.)

6 Sheets—Sheet 5.

H. F. STANLEY.
Cooling and Refrigerating Apparatus.

No. 240,049. Patented April 12, 1881.

Witnesses
Wm A Skinkle
Geo W Breck

Inventor,
Harry F. Stanley,
By his Attorneys
Baldwin, Hopkins & Peyton.

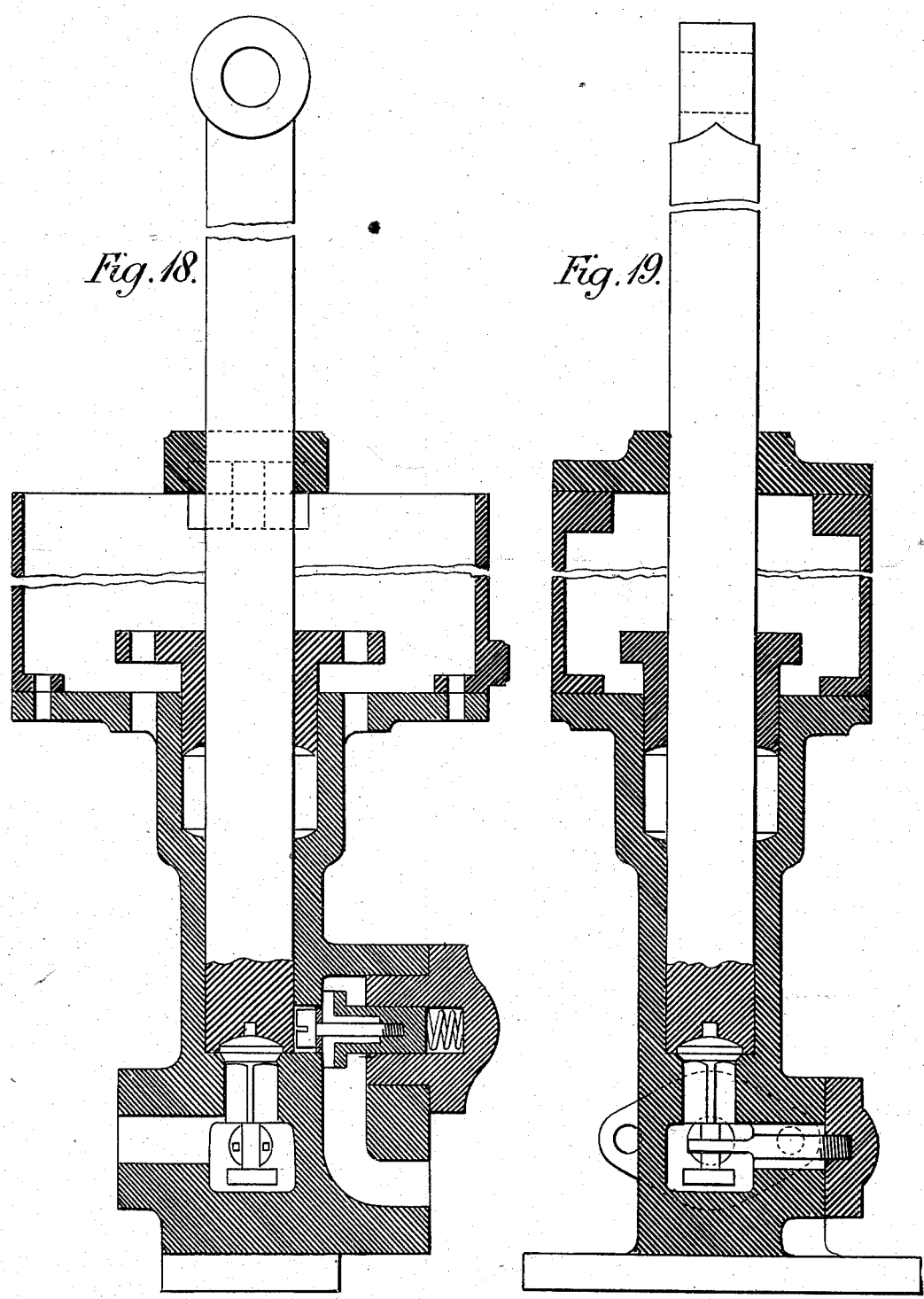

UNITED STATES PATENT OFFICE.

HARRY F. STANLEY, OF LONDON, ENGLAND.

COOLING AND REFRIGERATING APPARATUS.

SPECIFICATION forming part of Letters Patent No. 240,049, dated April 12, 1881.

Application filed February 16, 1881. (No model.) Patented in England November 10, 1875.

*To all whom it may concern:*

Be it known that I, HARRY FRANK STANLEY, a subject of the Queen of Great Britain, residing at Shoe Lane, in the city of London, England, have invented certain new and useful Improvements in Cooling and Refrigerating Apparatus, (for which I have obtained Letters Patent in England, No. 3,907, dated 10th November, 1875,) of which the following is a specification.

This invention relates to improvements in machines for producing cold, and especially to those machines in which the cold results from the expansion into gas of liquefied ammonia, and in which a supply of liquefied ammonia is constantly maintained by the recondensation of the ammonia vapor or gas.

The machine consists of the following parts:

First, the generator, or a vessel in which a weak aqueous solution of ammonia is heated, and ammonia-vapor, together with vapor of water, driven off from it.

Second, the analyzer, which is an apparatus receiving the vapors from the generator, and also a solution of ammonia from other parts of the machine. In the analyzer the ammonia-gas is to a great extent separated from the water accompanying it. The latter passes into the generator.

Third, the rectifier is the part of the machine which receives the ammonia-gas from the analyzer. Its function is to separate from the gas the aqueous vapor which it carries with it from the analyzer.

Fourth, the condenser is the part of the apparatus which receives the dry ammonia-gas, and here it is so far cooled that under the pressure at which it is contained in the machine it becomes liquid.

Fifth, the receiver is the vessel into which the liquefied ammonia runs from the condenser, and in which it is stored for use.

Sixth, the cooler is the vessel in which the liquefied ammonia is again allowed to expand into gas, and in doing so it takes up heat from pipes through which brine or other liquid to be cooled is caused to circulate.

Seventh, the absorber is the part or parts of the apparatus in which the ammonia-gas liberated in the cooler is again dissolved in water. For making the solution, weak liquor is drawn from the generator. It is cooled before use.

Eighth, the ammonia-pumps draw the strong aqueous solution of ammonia from the absorber and force it into the analyzer, from whence, after losing most of its gas, it passes into the generator.

Ninth, the heater is an apparatus which serves the double purpose of heating the ammonia-liquor after it leaves the pumps and before it reaches the analyzer, and of cooling the weak liquor drawn from the generator before it passes into the absorber to be recharged with ammonia-gas.

Figure 2:
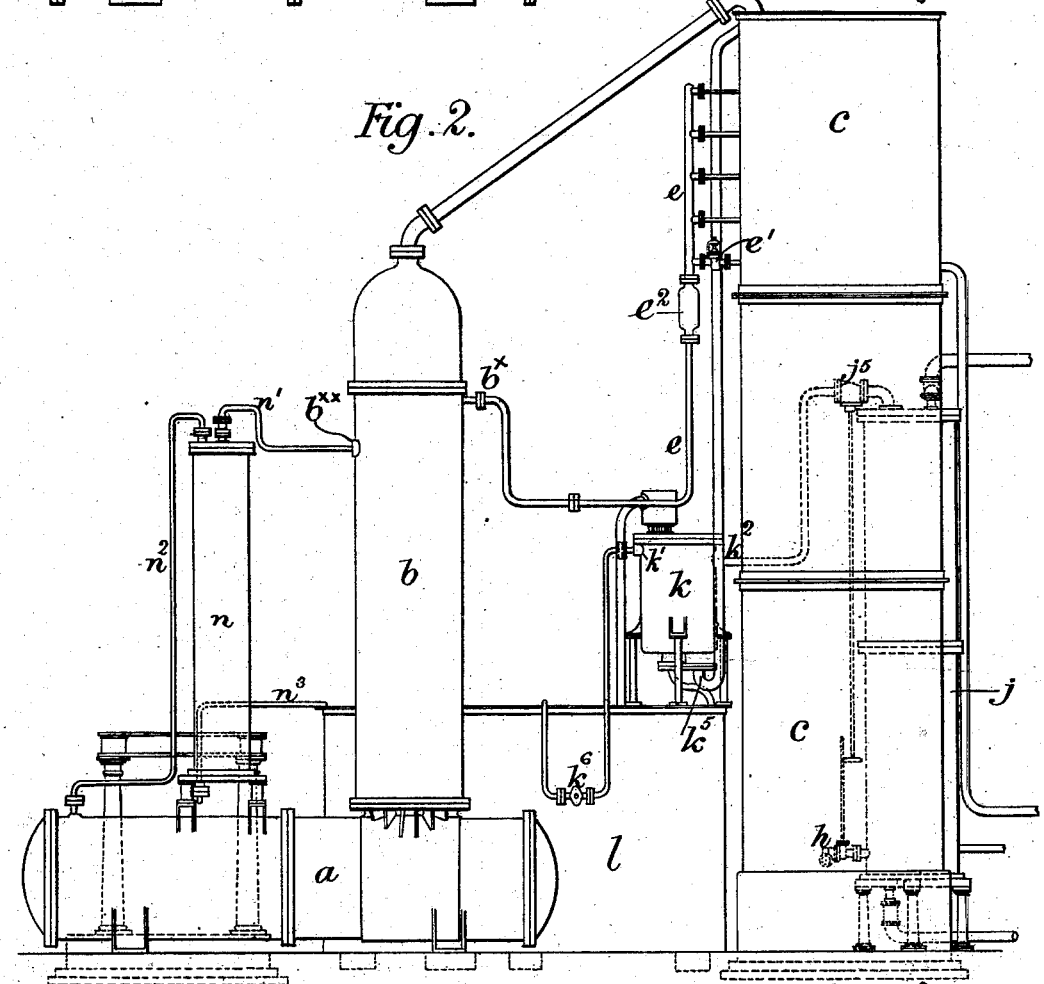
Figure 5:
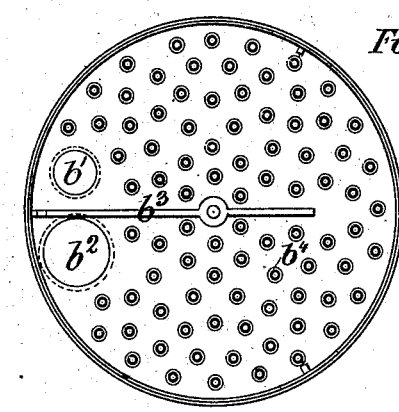
Figure 3:
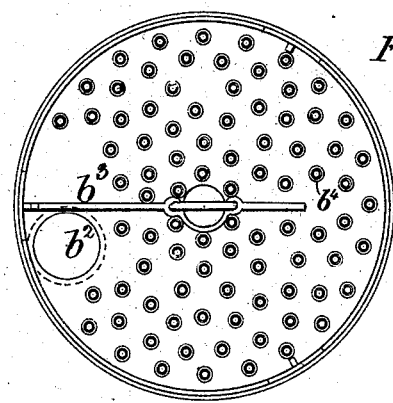
Figure 6:
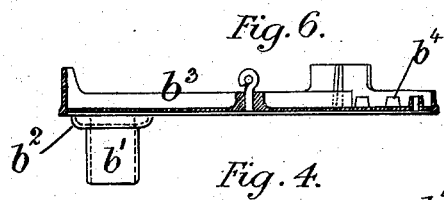
Figure 4:
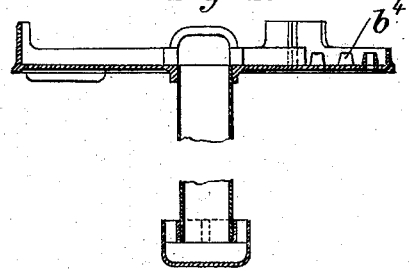
Figure 7:
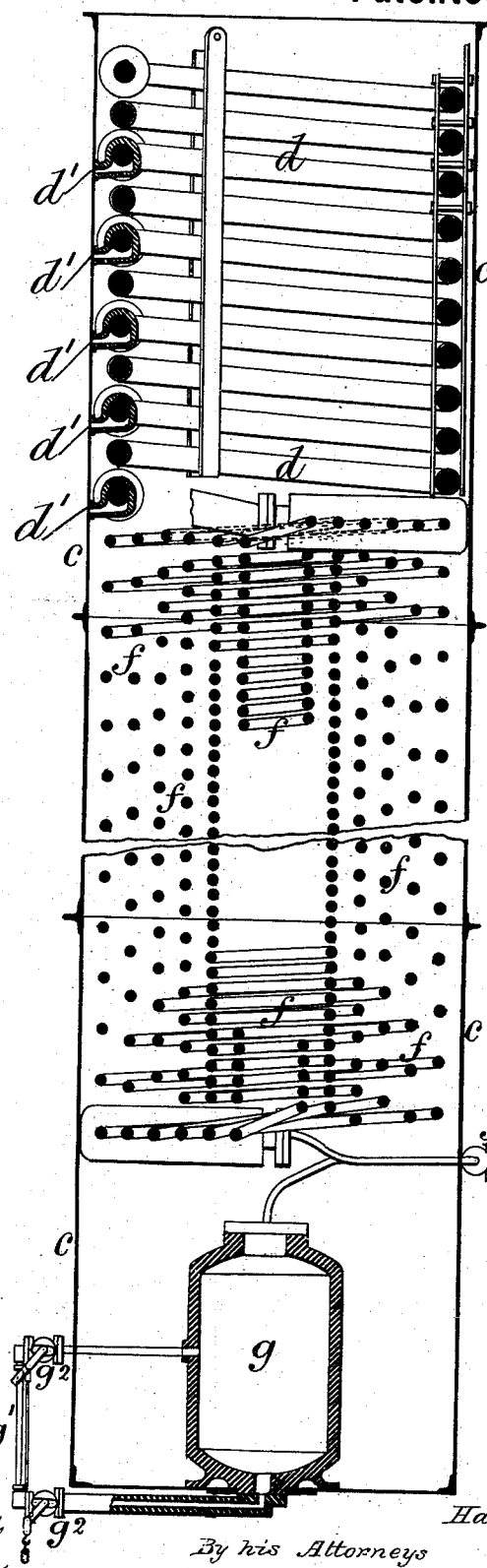
Figure 8:
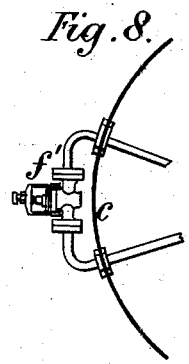
Figure 9:
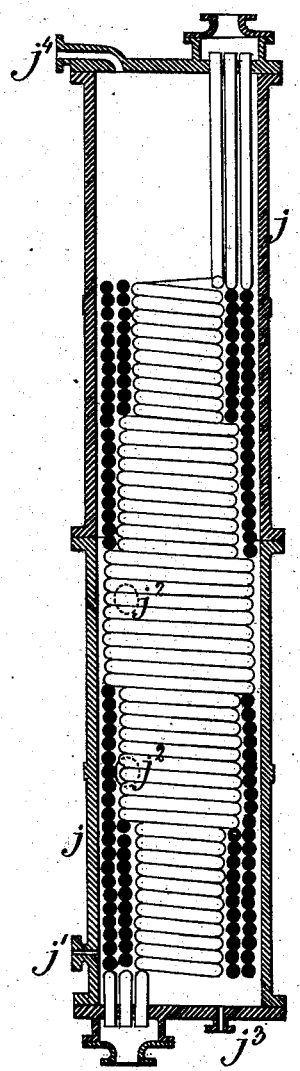
Figure 10:
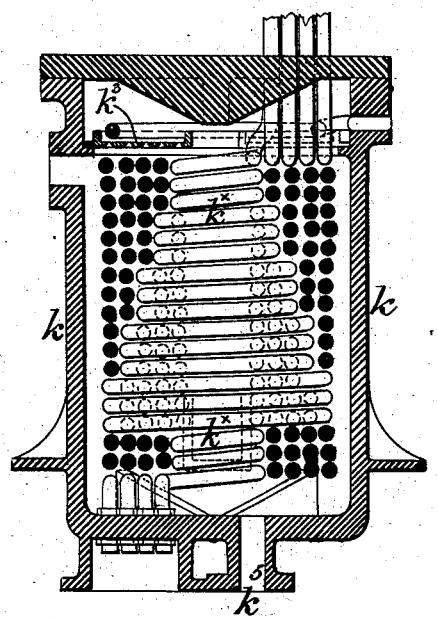
Figure 11:
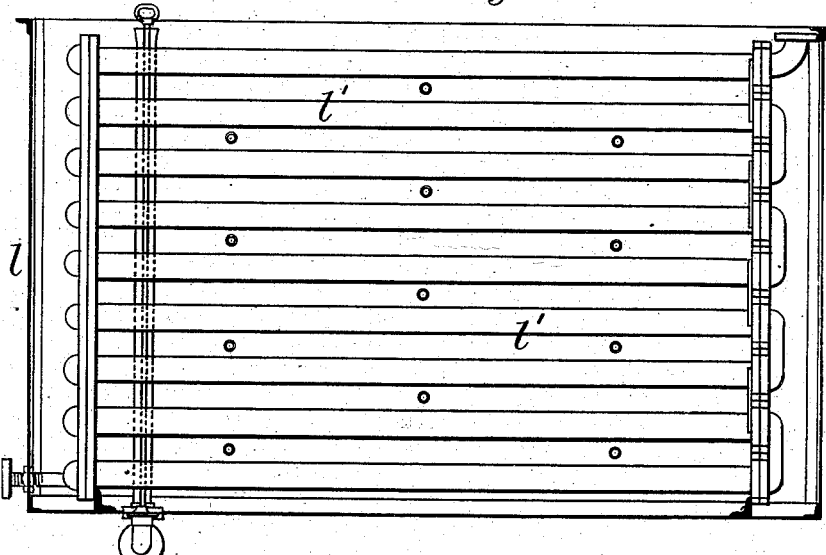
Figure 13:
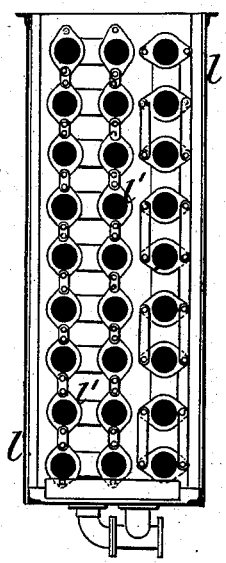
Figure 12:
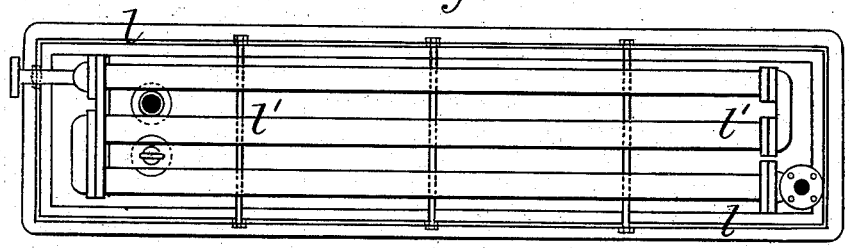
Figure 14:
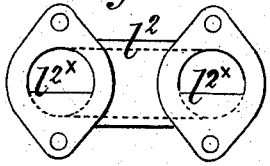
Figure 16:
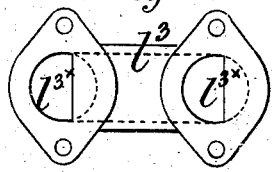
Figure 15:
Figure 17:

Figure 1 of the drawings annexed is a plan of a machine constructed in accordance with my invention. Fig. 2 is an elevation of the same. Fig. 3 is a plan of the bottom tray of the analyzer. Fig. 4 is a section of the same. Fig. 5 is a plan of any one of the trays above the bottom tray. Fig. 6 is a section of any one of the upper trays. Fig. 7 is a vertical section of the rectifier, condenser, and the receiver with their common tank or cistern. Fig. 8 is a plan showing the cock for closing the receiver. Fig. 9 is a vertical section of the cooler. Fig. 10 is a vertical section of the first absorber. Fig. 11 is a sectional elevation of the second absorber. Fig. 12 is a plan, and Fig. 13 is a vertical section, of the same. Fig. 14 is an elevation of one of the horizontal bends by which the pipes of the absorber are connected. Fig. 15 is a transverse section of the horizontal bend. Fig. 16 is an elevation of one of the vertical bends of the absorber. Fig. 17 is a transverse section of the same. Figs. 18 and 19 are vertical sections of one of the ammonia-pumps. The two sections are taken in planes at right angles, the one to the other.

The first improvement is in the generator. In place of applying fire-heat to the generator, I introduce into it a coil of steam-pipes for evaporating the ammoniacal liquor. The advantage of this is, that I am able to regulate the pressure and temperature in this generator much more easily than by fire-heat. The ammonia separates from the water better at a low temperature, and an even temperature is very essential to the good working of the apparatus, and cannot so well be obtained by a fire. I prefer to use a number of straight pipes connected together by bends. By this means I get a very large heating-surface.

The second improvement relates to the position of analyzer. I place it upon the generator, thereby economizing space and doing away with all connecting-pipes.

The third improvement relates to the construction of the trays of the analyzer. The analyzer contains a series of trays with passages, which I so arrange that the vapor and gas impinge on the bottoms of the trays and traverse the head without passing through the liquid. For this purpose the trays are provided each with nozzles, which serve as vapor-outlets, and an overflow-pipe, which is below the top of the vapor-outlets. As the ammonia-gas is driven from the solution by the heat of the vapor rising from the tray below it passes through the vapor-outlets into the rectifier without passing through the liquor on the tray above. The advantage gained by this arrangement is considerable, as water has such a strong affinity for ammonia that the ammonia-gas which has been separated from the liquor on one tray is absorbed again by the liquor on the next when the construction of the trays is such that the liquor rises over the nozzles. A great saving in fuel is obtained by allowing the ammonia-gas, when once separated from the water on each plate, to pass freely into the rectifier.

The fourth improvement relates to the rectifier. I apply a series of pockets upon the rectifying-coil in such manner that any moisture condensing in the coil passes almost immediately into a pocket, and is removed from contact with the ammonia-gas. The last pocket of the series is provided with a stop-cock, so that the liquid which it collects may or may not, at pleasure, be allowed to pass into the condenser. This I do because it happens, when the machine is in regular and good working, that all the water is separated from the gas before this pocket is reached. The advantage derived from the use of this series of pockets is, that if the ammonia-gas were to remain in contact with the condensed liquor as it descends the rectifying-coil the gas would not enter the condenser in that practically anhydrous state which is necessary to the economical working of the apparatus.

The fifth improvement relates to the rectifier and analyzer. I cause the strong liquor collected by the pockets of the rectifier to pass onto the upper tray of the analyzer, while the weaker liquor from the ammonia-pumps is delivered into the analyzer some trays lower down. From this arrangement it results that much of the gas is driven off from the strong liquor before it is allowed to mingle with the liquor from the pumps.

The sixth improvement consists in providing a receiving-vessel upon the pipe connecting the pockets of the rectifier with the analyzer. This receiving-vessel is of a size to contain all the liquor in the connecting-pipe, so that there may be no danger of a sudden change of pressure causing the passage back of the liquor into the rectifier.

The seventh improvement relates to the rectifier and condenser. The rectifier I place on the condenser, the cistern or container of the condenser and rectifier being one vessel. The advantage of this is that the same condensing water does for both rectifier and condenser, the water passing in at the bottom of the condenser, where the coldest water is wanted, and up the outside of the coil into the rectifier, and from thence it passes to the absorber. The receiver I also place in the same cistern or containing-vessel below the coils of the condenser.

The eighth improvement relates to the condenser. I employ several coils in the condenser, one within the other, and I make all these coils of the same length by varying the distances between the convolutions of the pipes of which the several coils are formed. By this means a greater uniformity in working is obtained, each condensing-coil being placed under similar conditions.

The ninth improvement relates to the cooler. In order that a small charge of liquefied ammonia may, when in the cooler, cover as large a surface as possible of the coils in which the brine or liquid to be cooled circulates, I fill up void spaces within and around the coils with wooden or other blocks or filling-pieces.

The tenth improvement relates to the absorber. I cause the liquor to dissolve the gas to fall as a shower through a chamber to which the gas is admitted, and which also contains coils of pipes, with water flowing through them to carry off the heat liberated in the solution of the gas. The absorption of the gas is effected in this manner more regularly, and without the concussions which occur when the first absorption takes place within pipes. The ammonia-liquor I, however, cause afterward to pass through pipes, where it is made to expose an extensive surface to the gas, and where its temperature is at the same time lowered by the contact of water with the exterior of the pipes.

The proper working of the machine depends largely on the detail arrangement and proportioning of the parts, which I will now proceed to describe more in detail.

The drawings, Figs. 1 and 2, are to a scale of one-quarter of an inch to a foot, and they represent a machine competent to eliminate seven hundred thousand heat-units per hour, or, say, 1° Fahrenheit from seven hundred thousand pounds of water.

The generator $a$ is three feet three inches in diameter and fourteen feet in length. It contains six hundred and sixteen feet run of two-inch pipe. This piping is arranged in three coils, one over the other, in the lower half of the cylinder. The pipes are arranged equidistant the one from the other, and arrangements are made by which, when required, a full supply of forty or fifty pounds steam can be given to them. The quantity of steam can be regulated by a steam-cock. By ordinary arrangements at the lower ends of the coils the water resulting from the condensation of the steam is delivered without permitting the escape of steam.

Upon one of the ends of the generator there is a gage-glass, showing how much liquid the generator contains. It should, when working, be about two-thirds full. There is also a pressure-gage and a thermometer upon the end of the generator. The working pressure depends greatly upon the temperature of the water used in the condenser, and will range, say, from one hundred and twenty to one hundred and eighty pounds to the square inch. The temperature of working may, for the same reason, have a considerable range—say, between 230° and 270° Fahrenheit.

The advantages of employing steam-heat are, that I am able to regulate the pressure and temperature more easily than by fire-heat. To work to the best advantage the liquid in the generator should contain a very small proportion of ammonia. To obtain this result it is necessary to evaporate an even quantity of vapor from the generator, which, passing into the analyzer, is just sufficient to separate the ammonia from the strong solution pumped into the top of the latter vessel. If the temperature in the generator falls below a certain point the vapor from it will not be sufficient to separate the ammonia in the analyzer, and some of it will find its way into the generator. On the other hand, if the temperature rises above a certain point water-vapor will pass through the analyzer into the rectifier and weaken the charge. With fire-heat it was found impossible in practice to keep the temperature so even as to prevent the above; but by the use of steam both are avoided, if not entirely, as far as is practically required.

The analyzer $b$ stands upon the generator and opens into it at the lower end. It is filled for the greater part of its height with trays, such as are shown by the Figs. 3, 4, 5, and 6. The lowest tray shown by the Figs. 3 and 4 differs somewhat from the trays above, which are all of the pattern shown by Figs. 5 and 6. Strong ammonia-liquor from the pockets of the rectifier is delivered at $b^x$ onto the uppermost tray, while the weaker but still strong liquor forced in by the ammonia-pumps is delivered at $b^{xx}$ onto the third or fourth tray. On each tray the liquor, after flowing over the surface of the tray, reaches a descending pipe, $b'$, by which it descends to the tray below. The lower end of each pipe $b'$ dips into a cup or hollow, $b^2$, which traps it, so that gas cannot pass by these pipes. $b^3$ is a partition formed upon the surface of each tray for the purpose of compelling the liquor to traverse the entire surface of the tray in passing from the cup $b^2$, where it enters upon the tray, to the pipe $b'$, by which it passes off. $b^4$ are nozzles upon the face of each tray protecting perforations by which the gas can pass freely upward. As before stated, it is of great importance that these nozzles should have their mouths well clear of the liquid standing on the trays. There are twenty-three plates in the analyzer, each two feet ten inches in diameter.

The rectifier, the condenser, and the receiver have one common containing vessel or cistern, $c$, to which cooling-water is supplied at the bottom and drawn off from the top.

The rectifier $d$ is a coil of four-inch pipe about five feet in diameter, and into every alternate convolution a pocket, $d'$, is introduced. These pockets intercept liquid draining down the pipe, and by connections passing through the side of the cistern $c$, and shown by the drawings, they deliver it into a pipe, $e$. At $e'$ there is a cock, which, when closed, prevents liquid passing from the lowest pocket, $d'$, into the pipe $e$. The pipe $e$ conducts the liquor back to the upper tray of the analyzer. $e^2$ is a receiving-vessel on the pipe $e$. The gas is led by a pipe (shown in the drawings) from the top of the analyzer into the upper end of the rectifier-coil $d$.

The condensing-coils $ff$ are six in number. They are of equal lengths, and each consists of two hundred and forty-two feet run of inch-and-a-half pipe. The coils are arranged concentrically, and so as to obtain a good distribution of the pipes within the cistern $c$. In order to maintain equality in the length of the several coils, the convolutions are necessarily much wider apart in the outer coils than in those which are nearer to the center and smaller in diameter. All the coils $ff$ at their upper end are brought to a connector, which is attached at the lower end of the rectifier-coil $d$. The lower ends of the condenser-coils are also coupled up to one common connector, from which a pipe is brought out through the side of the cistern $c$, in order that it may receive a stop-cock, $f'$, which is closed when it is desired to confine the liquefied gas in the receiver. The connecting-pipe re-enters the cistern and delivers into the receiver through its cover.

The receiver $g$ is simply a strong iron vessel, in which the liquefied ammonia is stored. It is contained within the cistern $c$, and is immersed in the cooling-water to keep it at as low a temperature as possible. The receiver is connected by pipes passing through the side of the cistern $c$ with a gage-glass, $g'$, in which the level of the liquid can be seen. Taps $g^{2'} g^2$ are provided on the connecting pipes, and they are weighted so as to be self-closing. As a precaution against accidents, the gage is only allowed to be in communication with the receiver while the level is being observed. $g^3$ is a pipe by which the liquefied ammonia is drawn out of the receiver to supply the cooler, and $h$ is a regulating-cock provided upon this pipe. As in working the machine the cock $h$ requires to be accurately set, a worm-wheel is provided upon the neck of its plug, and the worm-wheel is turned by a worm engaging with it. The spindle of the worm carries a hand-wheel.

The cooler $j$ is a cylindrical vessel two feet five inches in diameter and thirteen feet six inches long. It contains three coils of two-inch pipe, having a total length of four hundred and sixteen feet. By connections at the top and bottom the brine or liquid to be cooled is made to pass through these coils. The liquefied ammonia is admitted at $j'$, and at $j^2$ $j^2$ a gage-glass is connected, in which the level of the liquefied ammonia in the cooler may be seen. In connection with the gage, self-closing taps are provided, as already described in respect to the gage upon the receiver. $j^3$ is an outlet by which the cooler may be emptied and its contents allowed to pass away to the ammonia-pumps when the charge from any cause may have become diluted with water. $j^4$ is the outlet by which the ammonia-gas passes to the absorber. It is connected with a pipe, upon which there is a cock, $j^5$. There is a pressure-gage upon the cooler, showing the gas-pressure within, whether it be above or below atmospheric pressure. There are also thermometers in the brine or circulating liquid, showing its temperature as it passes into and as it leaves the coils of the cooler.

As a guide to the working of the machine, it may be stated that the temperature of the cooled brine or liquid in Fahrenheit degrees should be a smaller number than that representing the gas-pressure and shown by the gage in pounds per square inch.

The space within the inner coil of the cooler is filled with a cylindrical block of wood, which, however, is not shown in the drawings. Other spaces may, with advantage, be similarly filled to enable a comparatively small quantity of liquefied ammonia to cover a large extent of coil-surface. Ample space should, nevertheless, be left for the ammonia-gas evolved from the liquid to rise to the surface and pass away.

The first absorber, $k$, is a cylindrical vessel two feet in diameter and three feet two inches high, and containing six coils, $k^\times$, of one-inch pipe, with a total length of three hundred feet. Through these coils a part of the cooling-water after it leaves the cistern $c$ is caused to pass, entering at the lower ends of the coils and passing away in a heated state from the top of the coils. The water or weak liquor drawn from the generator enters at $k'$ and the gas comes in from the cooler at $k^2$. The liquor is delivered in small streams through perforations in a ring-pipe onto a perforated plate, $k^3$, and it falls in drops onto the pipes $k^\times$. The weak liquor very rapidly absorbs the gas which the vessel contains, and the ammonia solution passes out at the bottom of this absorber at $k^5$. A pressure-gage shows the gas-pressure in the absorber. This is often lower than the atmospheric pressure. There is a cock, $k^6$, upon the pipe, by which the weak liquor is admitted to regulate the supply. The ammonia-liquor passes, together with some of the gas from the first absorber, into a second absorber.

The second absorber, $l$, is a water-tank containing two hundred and seventy feet run of four-inch pipe. These pipes $l'$ are distributed in nine series, one over the other. There are three straight pipes in each series. The ammonia liquor and gas from the first absorber enter together into the uppermost series of pipes. The pipes are connected by bends, so that the liquor flows and the gas passes along through the pipes of the first series, then descends to the second series, and, after traversing these pipes, descends to the third series, and so on. The pipes are kept half-full of liquor, there being stops in the bends to insure this. $l^2$ are the horizontal bends, and the stops in them are marked $l^{2\times}$. $l^3$ are the vertical bends, and the stops in them are marked $l^{3\times}$. The ammonia-liquor is drawn off from the bottom or lowest series of pipes by the ammonia-pumps. The water in the tank of this absorber becomes warmed by the heat set free by the gas as it dissolves. The supply should be such that the temperature of the water may not rise higher than 130° or 140°.

The ammonia-pumps $m$ $m$ $m$ are plunger-pumps, in which the clearances are reduced to the smallest dimensions, so that at each stroke the barrel may be emptied, leaving scarcely any liquor behind. But for this precaution there would be difficulty arising from the liberation of gas by the residual liquor preventing the opening of the suction-valve. Above the stuffing-box there is a trough containing water, by which any leakage of gas is absorbed. Stop-cocks are provided, one on each side of each pump, so that without stopping the machine a pump may be put out of work, in order that the gland may be repacked when necessary. A safety-valve is also provided, so that damage may not result from the pump being (by inadvertance) set to work before the delivery-cock is opened. The pumps are three in number, and about eighteen or twenty horse-power should be available for working them.

The heater $m$ is a cylindrical vessel about one foot six inches in diameter and nine feet three inches high. It stands above the generator, and contains two coils of one-and-a-half inch pipe, having a total length of two hundred and ninety-five feet. The ammonia-pumps deliver the liquor into these coils at their lower ends, where a connection is made beneath the bottom of the heater. At the top of the heater the coils deliver the liquor into a pipe, $n'$, which discharges it onto the third or fourth plate of the analyzer, as already described. The weak and hot liquor from the generator is conveyed into the heater by a pipe, $n^2$. It descends through the heater, imparting its heat to the liquor ascending in the coils on its way to the analyzer. The water or weak liquor from the generator passes out at the bottom of the heater in a cooled condition into the pipe $n^3$. The pipe $n^3$ afterward dips into the tank of the absorber $l$, to effect a further cooling of the weak liquor before it reaches the cock $k^6$, by which its admission into the absorber is regulated. All the cocks employed in the machine are provided with bridles and set-screws, by which the plugs may be held down while the packing is renewed.

Having thus described the nature of my said invention and the manner of performing the same, I would have it understood that I claim—

1. The application of steam-heat to the generator $a$, substantially as herein described.

2. The combination of the generator $a$ and the analyzer $b$, the latter being mounted upon and communicating directly with the former, substantially as herein described.

3. The construction of the analyzer-trays with their nozzles $b^4$ rising above the liquid on the tray, substantially as herein described.

4. The pockets $d'$ upon the rectifier-coil, which intercept and convey away liquid condensing therein, substantially as herein described.

5. The connections between the analyzer, rectifier, and absorber, by which the liquor from the rectifier is delivered onto an upper tray, and the liquor from the absorber onto a lower tray, substantially as herein described.

6. The receiving-vessel $e^2$ upon the pipe $e$, substantially as herein described.

7. The combination of the rectifier and the condenser with their common cistern $c$, substantially as herein described.

8. The construction of the condenser with several coils, $f\ f$, all of the same length, and contained in a cistern, $c$, substantially as herein described.

9. The combination, with the cooler, of the filling-block within the coils of the cooler $j$, substantially as herein described.

10. The construction of the absorber $k$ where the gas is brought into contact with water or weak liquor trickling over pipes cooled by water passing through them, substantially as herein described.

London, 26th January, 1881.

HARRY FRANK STANLEY.

Witnesses:
 THOS. LAKE,
 JNO. DEAN,
 *Both of* 17 *Gracechurch Street, London.*